US010764324B2

(12) United States Patent
Chang et al.

(10) Patent No.: US 10,764,324 B2
(45) Date of Patent: Sep. 1, 2020

(54) SECURITY ROUTING SYSTEM FOR USE IN IOT APPARATUS

(71) Applicants: Kung-Wei Chang, Taipei (TW); Yi-Fen Chou, Keelung (TW)

(72) Inventors: Kung-Wei Chang, Taipei (TW); Yi-Fen Chou, Keelung (TW)

(*) Notice: Subject to any disclaimer, the term of this patent is extended or adjusted under 35 U.S.C. 154(b) by 262 days.

(21) Appl. No.: 15/849,392

(22) Filed: Dec. 20, 2017

(65) Prior Publication Data

US 2018/0183832 A1 Jun. 28, 2018

Related U.S. Application Data

(60) Provisional application No. 62/438,150, filed on Dec. 22, 2016.

(51) Int. Cl.

| | |
|---|---|
| *H04W 4/38* | (2018.01) |
| *H04L 29/06* | (2006.01) |
| *H04W 4/70* | (2018.01) |
| *H04W 4/50* | (2018.01) |
| *H04W 12/00* | (2009.01) |
| *H04W 12/12* | (2009.01) |

(52) U.S. Cl.
CPC ...... *H04L 63/1466* (2013.01); *H04L 63/0428* (2013.01); *H04L 63/1416* (2013.01); *H04W 4/38* (2018.02); *H04W 4/50* (2018.02); *H04W 4/70* (2018.02); *H04W 12/0023* (2019.01); *H04W 12/1204* (2019.01)

(58) Field of Classification Search
CPC ............ H04L 63/1466; H04L 63/0428; H04L 63/1416; H04W 4/38
See application file for complete search history.

(56) References Cited

U.S. PATENT DOCUMENTS

| | | | | |
|---|---|---|---|---|
| 2008/0126746 | A1* | 5/2008 | Hyduke | G06F 21/552 712/17 |
| 2011/0246766 | A1* | 10/2011 | Orsini | G06F 21/6218 713/160 |
| 2015/0154416 | A1* | 6/2015 | Depinay | G06F 21/6245 726/28 |
| 2017/0078922 | A1* | 3/2017 | Raleigh | H04W 28/10 |
| 2017/0149825 | A1* | 5/2017 | Gukal | H04L 63/1491 |
| 2017/0324576 | A1* | 11/2017 | Jain | G06F 9/50 |
| 2017/0359237 | A1* | 12/2017 | Hao | H04L 67/02 |
| 2018/0150341 | A1* | 5/2018 | Pan | G06F 9/5027 |
| 2018/0152406 | A1* | 5/2018 | Kuo | H04L 12/1859 |
| 2018/0167476 | A1* | 6/2018 | Hoffner | H04L 67/26 |
| 2018/0205808 | A1* | 7/2018 | Yang | H04W 40/02 |
| 2018/0262388 | A1* | 9/2018 | Johnson | G06F 9/448 |

* cited by examiner

*Primary Examiner* — Lynn D Feild
*Assistant Examiner* — Vladimir I Gavrilenko
(74) *Attorney, Agent, or Firm* — Womble Bond Dickinson (US) LLP

(57) ABSTRACT

A routing system for use in an IoT apparatus is proposed to include a router device. A control module of the router device determines whether to execute a routing process relating to an input message based on environment information, status information and a conflict management mechanism that relate to the router device. In the routing process, the control module executes channel operations when the input message includes a channel management instruction, and executes, when the input message relates to authentication or an application program, a relevant verification procedure or the application program.

22 Claims, 8 Drawing Sheets

SECURITY ROUTING SYSTEM FOR USE IN IOT APPARATUS

CROSS-REFERENCE TO RELATED APPLICATION

This application claims priority of U.S. Provisional Patent Application No. 62/438,150, filed on Dec. 22, 2016.

FIELD

The disclosure relates to a routing system, and more particularly to a security routing system for use in an IoT (Internet-of-things) apparatus.

BACKGROUND

In conventional IoT applications, a mobile communication device often connects to network-enabled apparatuses (things), such as smart locks, smart appliances, autonomous cars, via, for example, WiFi modules, Bluetooth modules, BLE (Bluetooth low energy), Zigbee modules, baseband modules (2G/3G/4G/5G LTE/NB-IoT (NarrowBand IoT)), of the network-enabled apparatuses that serve as host communication controllers thereof, to thereby perform operational control on controlled devices of the network-enabled apparatuses (the parts that perform normal operations and functions of the network-enabled apparatuses, such as the physical lock of a smart lock, the air-conditioning component(s) of a smart air conditioner, an engine control unit (ECU) of an autonomous vehicle) via mobile networks or the Internet. However, security flaws may exist in the controlled devices and the host communication controllers, particularly for open-source operating systems (OSs), such as Linux, Android, real-time OS (RTOS), etc. Hackers may employ the security flaws to hack into the controlled devices and the host communication controllers, resulting in big problems.

SUMMARY

Accordingly, how to enhance security of IoT applications in open-sourced operating systems that may benefit development of the IoT technology is a goal in the relevant industry.

Therefore, an object of the disclosure is to provide a routing system that can alleviate at least one of the drawbacks of the prior art.

According to the disclosure, the routing system is adapted for use in an Internet-of-things (IoT) apparatus that includes a host communication control module supporting multiple communication protocols, and a controlled device. The routing system includes a router device that includes a connection unit, a switch module, a control module, a storage module, and an identity verification module.

The connection unit complies with the communication protocols, and includes a plurality of input-output (I/O) ports including a first I/O port to be electrically connected to the host communication control module and supporting protocol conversion for any message from the host communication control module, and a second I/O port to be electrically connected to the controlled device and supporting protocol conversion for any message from the controlled device.

The switch module is electrically connected to the connection unit, and is operable to selectively establish communication paths among the I/O ports.

The control module is electrically connected to the switch module for controlling switching operation thereof and supports multi-channel operation.

The storage module is electrically connected to the control module, and includes a program zone in which a plurality of application programs respectively corresponding to different application identifiers are stored, a setting zone in which environment setting information relating to the connection unit is stored, and a status zone in which status information that indicates a current execution status of the router device is stored. The environment setting information includes application identifier information that indicates the application identifiers corresponding to the application programs that are capable of being used by the I/O ports, and priority information that indicates priorities of the I/O ports.

The identity verification module is electrically connected to the control module, stores therein identity verification data and password data relating to identity verification for at least one user device that is connected to the host communication control module or at least one user of said at least one user device, and key data for encryption operation on transmission of messages, and encryption-decryption operation on the messages.

When the control module receives an input message through the switch module and a source port which is one of the I/O ports, the control module determines whether to execute a routing process relating to the input message according to the environment setting information stored in the setting zone, the status information stored in the status zone, and a predetermined conflict management mechanism.

When the control module determines to not execute the routing process relating to the input message, the control module controls switching operation of the switch module to transmit a busy response notifying one of a busy status and a waiting instruction to the source port through the switch module.

When the control module determines to execute the routing process relating to the input message, the control module executes the routing process that relates to the input message.

The routing process includes: upon determining that the input message includes a multi-channel management instruction, opening a specific channel corresponding to a specific kernel according to the multi-channel management instruction, closing other channels that correspond to the specific kernel, controlling switching operation of the switch module to transmit a channel management result to the source port through the switch module, and updating the status information that is stored in the status zone according to the channel management result; upon determining that the input message includes a user-device authentication instruction relating to a to-be-authenticated user device that generates the input message, transmitting the input message to the identity verification module, cooperating with the identity verification module to execute a verification procedure that corresponds to the user-device authentication instruction based on the identity verification data, the password data and the input message, and controlling, upon receipt a successful verification result from the identity verification module, switching operation of the switch module to transmit the successful verification result to the source port; and upon determining that the input message relates to one of an application instruction and an application authentication instruction, performing specific operations.

The specific operations include an operation of executing one of the application programs stored in the program zone that corresponds to the one of the application instruction and the application authentication instruction to acquire an execution result; an operation of, upon determining that the one of the application programs that corresponds to the one of the application instruction and the application authentication instruction includes a control instruction relating to another one of the I/O ports, controlling switching operation of the switch module to transmit the control instruction to the another one of the I/O ports through the switch module, and updating the status information stored in the status zone; and an operation of, upon determining that the execution result does not contain any error messages or abnormal messages, controlling switching operation of the switching module to transmit a completion response corresponding to the input message to the source port for notifying that the routing process has been completed.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
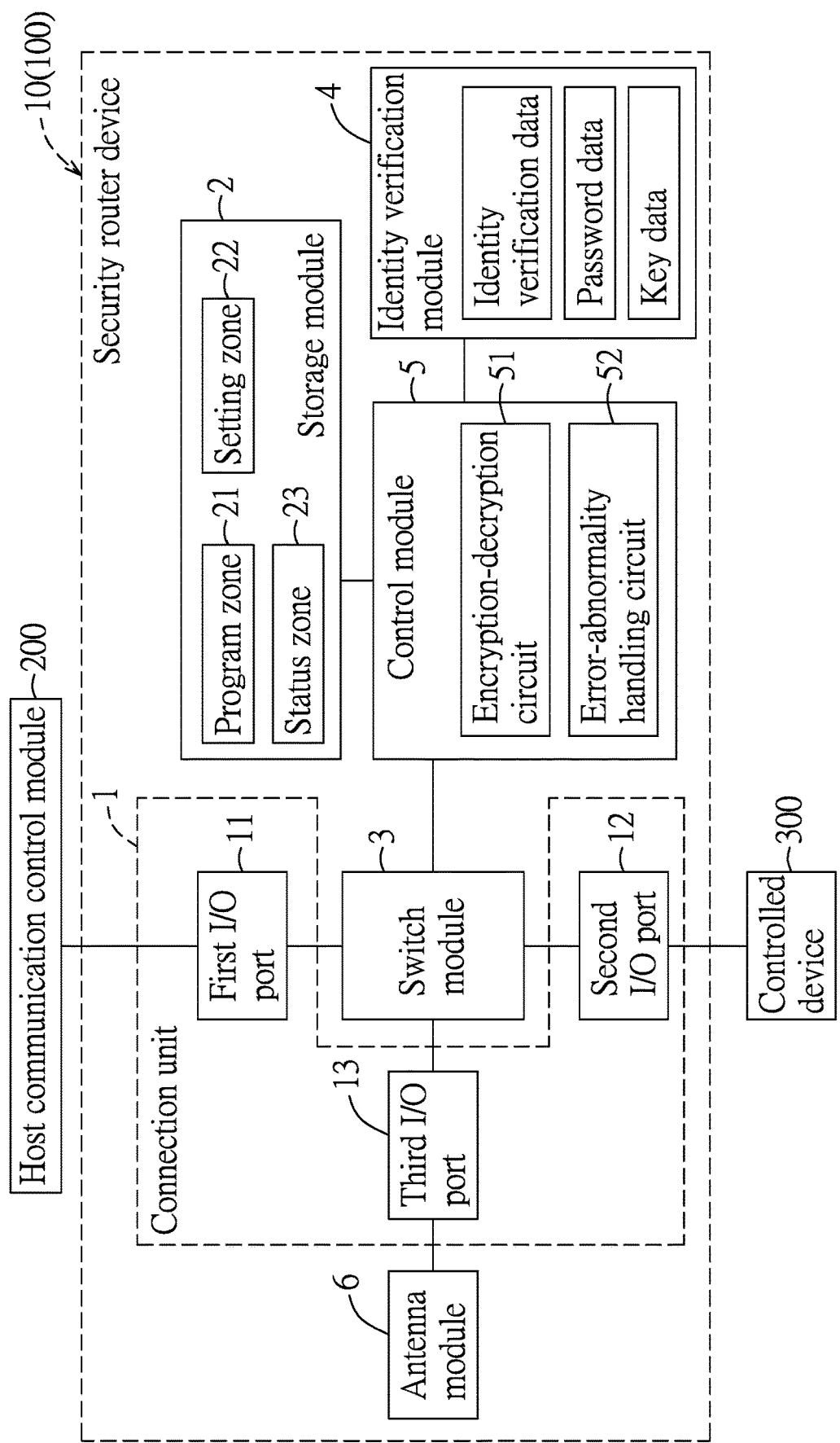
FIG. 1 is a block diagram illustrating a first embodiment of the routing system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the first embodiment of a security routing system 100 according to this disclosure is adapted for use in a smart IoT apparatus (e.g., an unmanned aerial vehicle (UAV), an intelligent vehicle, a smart appliance, a remote medical device, a web camera apparatus, etc.). In this embodiment, the smart IoT apparatus includes a host communication control module 200 for receiving instructions from a user end (e.g., a smartphone, not shown) and a controlled device 300 (the part that performs normal operations and functions of the smart IoT apparatus, e.g., an engine control unit (ECU) of an unmanned aerial vehicle or an intelligent vehicle, refrigerating component(s) of a smart refrigerator, component(s) of diagnostic and/or therapeutic purposes of a remote medical device, etc., and that is configured to controlled by the instructions provided by the user end). The controlled device 300 is not limited to the abovementioned examples. The host communication control module 200 supports multiple communication protocols, each of which may be selected from, for example, WiFi, BLE, Zigbee, 2G, 3G, 4GLTE (4G long term evolution), NB-IoT (NarrowBand Internet of things), LoRa (long range), etc., but this disclosure is not limited in this respect. In this embodiment, the host communication control module 200 further provides electric power (e.g., originating from an electric outlet, batteries, etc.) and clock signal required for operation of the security routing system 100, and includes a security router device 10.

The security router device 10 supports operations of a virtual machine, which is exemplified to comply with a Global Platform Card specification, and is capable of over-the-air (OTA) update. It is noted that, in this embodiment, the security router device 10 is configured to comply with a Common Criteria standard at a level equal to or over evaluation assurance level 4 (EAL 4) in terms of both hardware and software, so that security of operation can be ensured, and the security router device 10 can be deemed a security element. In this embodiment, the security router device 10 includes a connection unit 1, a storage module 2, a switch module 3, an identity verification module 4, a control module 5 and an antenna module 6.

The connection unit 1 complies with the communication protocols supported by the host communication control module 200, and includes a plurality of input-output (I/O) ports including a first I/O port 11, a second I/O port 12 and a third I/O port 13, but this disclosure is not limited to such. The first I/O port 11 is electrically coupled to the host communication control module 200 and supports protocol conversion for any message from the host communication control module 200. To be clearer, the first I/O port 11 may have an interface complying with the ISO 7816 specification or the universal asynchronous receiver-transmitter (UART) specification, the second I/O port 12 may have an interface complying with the UART specification, the third I/O port 13 may have an interface complying with the ISO 14443 specification, and the other I/O ports that are not shown in FIG. 1 may each be configured to be a general-purpose input-output (GPIO) port, or to have an interface complying with the inter-integrated circuit ($I^2C$) specification, the serial peripheral interface (SPI) specification, the pulse width modulation (PWM) specification, etc., but this disclosure is not limited in this respect.

The storage module 2 includes a program zone 21, a setting zone 22 and a status zone 23. The program zone 21 stores a plurality of application programs respectively corresponding to different application identifiers (AIDs). The setting zone 22 stores environment setting information relating to the connection unit 1. The status zone 23 stores status information that indicates a current execution status of the virtual machine architecture of the security router device 10. The application programs include one or more Java applets that are relevant to operations of the controlled device 300, and one or more SIM (subscriber identity module) application toolkits. The environment setting information includes application identifier information that indicates the application identifiers corresponding to the application programs which are capable of being used by the I/O ports 11-13, and priority information that indicates priorities of the I/O ports 11-13. The priorities of the I/O ports 11-13 may be defined by users according to characteristics and functions of the controlled device 300, and/or a device that provides inputs to the security router device 10. In this embodiment, the status information includes, for example: channel flag information that indicates a channel registration condition of a channel currently registered by a request port which is one of the I/O ports; application execution information that indicates the application identifiers corresponding to the application programs currently being executed through channels which are currently registered; I/O port occupation information that indicates occupation conditions of the I/O ports; and channel status information that indicates status of the channels which are currently registered by an executed program.

The switch module 3 is electrically connected to the connection unit 1, and operable to selectively establish communication paths among the I/O ports 11-13.

The identity verification module 4 stores therein identity verification data and password data relating to identity verification for user devices (that are connected to the host communication control module 200; examples of the user devices include a smartphone, a smart watch, etc.) and users (of the user devices, where the term "user" may refer to a virtual user, such as a cloud service of a service provider, or a physical user, such as an owner of the user device or a government agency) for verifying identity of the user devices, and key data for use in performing encryption operation on transmission of messages (e.g., secure socket layer (SSL), transport layer security (TLS), etc.), and encryption-decryption operation on the messages (e.g., symmetric-key algorithms such as advanced encryption standard (AES), data encryption standard (DES) and Blowfish, or asymmetric-key algorithms such as public key infrastructure (PKI), elliptic curve cryptography (ECC) and SM2-ECC). In this embodiment, the identity verification module 4 can serve as a SIM verification module for verifying subscriber identity modules (SIMs), which may be utilized to verification systems in either the public sector or the private sector, such as for banks, public safety, transportation, medical insurance, etc.

The control module 5 is electrically connected to the connection unit 1, the storage module 2, the switch module 3 and the identity verification module 4, controls switching operation of the switch module 3, and supports multi-channel operation. In this embodiment, the control module 5 includes an encryption-decryption circuit 51 and an error-abnormality handling circuit 52. The encryption-decryption circuit 51 is configured to perform encryption and decryption operations based on the key data stored in the identity verification module 4 and one or more of the abovementioned symmetric-key algorithms and asymmetric-key algorithms. The error-abnormality handling circuit 52 is configured to perform analysis on an unfavorable event, which may be an error/false event or an abnormal event, and determines an operation corresponding to the analyzed unfavorable event. In one embodiment, the control module 5 further uses a check algorithm (e.g., secure hash algorithm (SHA), message-digest algorithm 5 (MD5), cyclic redundancy check (CRC), etc.) to check, before the encryption-decryption circuit 51 performs a decryption operation on an encrypted message, whether the encrypted message has been tampered with, and the encryption-decryption circuit 51 performs the decryption operation only when the encrypted message is checked as not having been tampered with.

In this embodiment, the antenna module 6 is electrically connected to the third I/O port 13, supports radio frequency identification (RFID) techniques, and complies with the ISO 14443 specification. The antenna module 6 is used as an alternative communicating means for the security routing system 100. In other embodiments, the antenna module 6 and the third I/O port 13 may be omitted according to a user demand.

In this embodiment, the control module 5 and the switch module 3 are configured as two independent hardware units. In other embodiments, the control module 5 and the switch module 3 may be integrated as a single core unit or a multi-core unit by hardware, software, or a combination thereof.

It is noted that, when the host communication control module 200 that is connected to the first I/O port 11 is being initialized (e.g., an initialization process for the security router device 10 during manufacturing in a factory) the application programs, the control module 5 may load, using the over-the-air download techniques, the application programs and the environment setting information from a data source terminal (not shown) into the storage module 2 through the host communication control module 200 that is connected to the first I/O port 11, and load the identity verification data, the password data and the key data from the data source terminal into the identity verification module 4 through the host communication control module 200. An operation system for the security router device 10 and relevant management settings may also be loaded in the security router device 10 during the initialization process. In addition, update of the environment setting information by the control module 5 is permitted when the security router device 10 is being reset, or in response to an update instruction received from one of the I/O ports 11-13 and verified by the control module 5.

Figure 2:
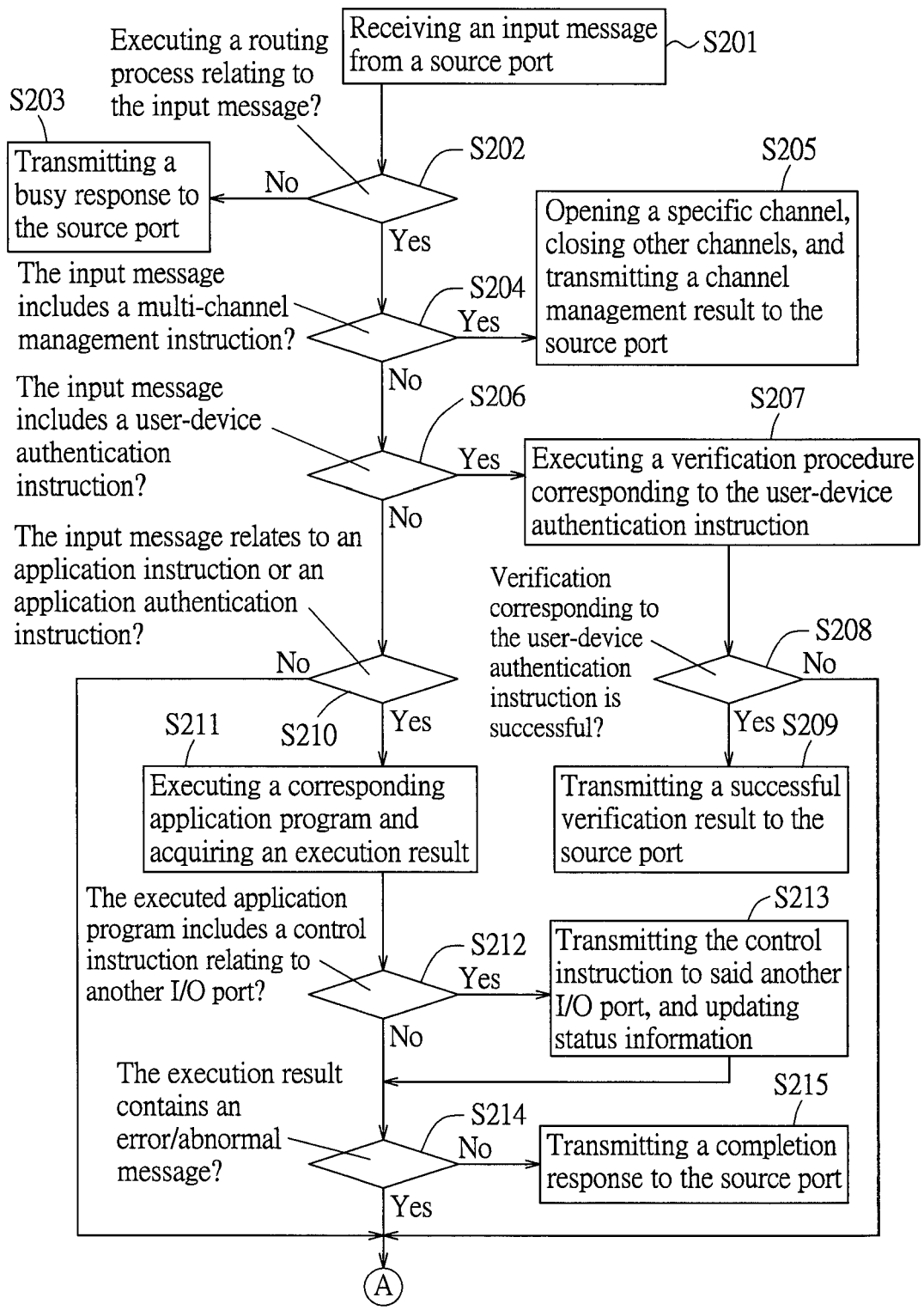
FIGS. 2 and 3 cooperatively form a flow chart illustrating steps of security routing performed by the routing system of this disclosure.
Figure 3:
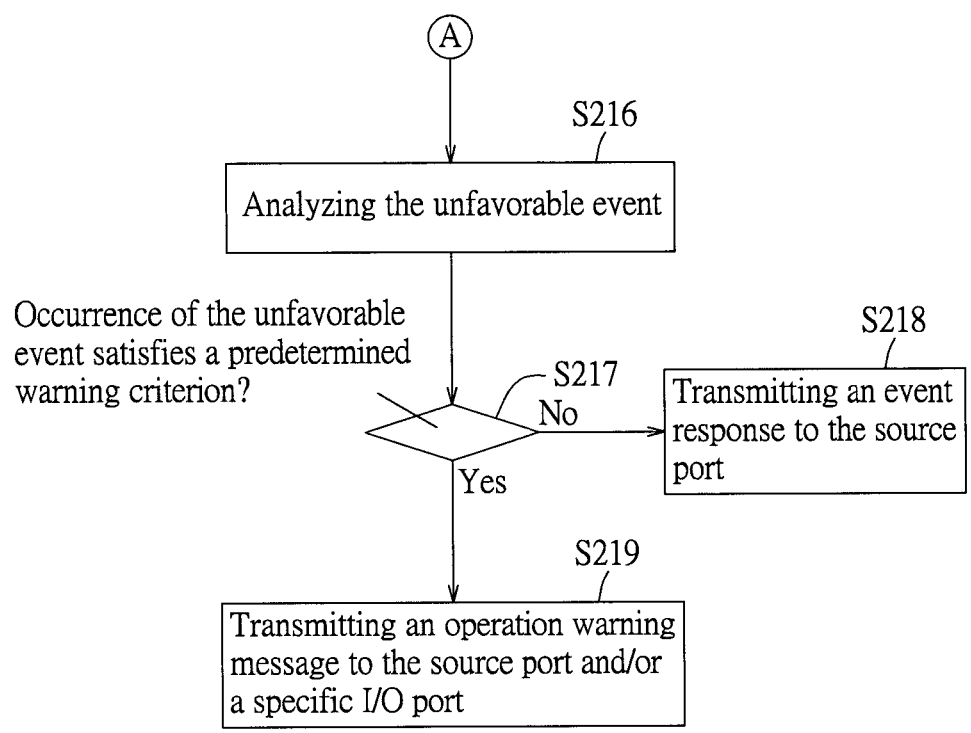

Referring to FIGS. 1 through 3, steps of performing security routing by the security router device 10 are illustrated.

When the control module 5 receives an input message through the switch module 3 and a source port which is one of the I/O ports 11-13 (step S201), the control module 5 determines whether to execute a routing process relating to the input message according to the environment setting information stored in the setting zone 22, the status information stored in the status zone 23, and a predetermined conflict management mechanism (step S202). When the control module 5 determines to not execute the routing process relating to the input message, the control module 5 controls switching operation of the switch module 3 to transmit a busy response for notifying one of a busy status and a waiting instruction to the source port through the switch module 3 (step S203), and waits for receipt of a confirmation response corresponding to the busy response from the source port. When the control module 5 determines to execute the routing process relating to the input message, the control module 5 executes the routing process that relates to the input message and the flow goes to step S204. Specifically, in step S202, when the control module 5 determines, according to the priority information, that the priority of the source port is higher than that of a (current) request port, which is another one of the I/O ports 11-13, and determines, based on the predetermined conflict management mechanism and the I/O port occupation information, that the source port has not been occupied, the control module 5 determines to execute the routing process that relates to the input message, suspends execution of and temporarily saves each of the application programs executed through the channels which are currently registered, and updates the status information accordingly; when the control module 5 determines, according to the priority information, that the priority of the source port is lower than that of the request port, the control module 5 determines to not execute the routing process relating to the input message; and when the control module 5 determines, based on the predetermined conflict management mechanism and the I/O port occupation information, that the source port has been occupied, the control module 5 determines to not execute the routing process relating to the input message.

The following Table 1 exemplarily shows the application identifier information and the priority information.

TABLE 1

| | Application identifier information | Priority information | | |
|---|---|---|---|---|
| I/O port | | Case 1 - NB-IoT | Case 2 - WiFi | Case 3 - Fire alarm |
| First I/O port | AID001 | 1 | 1 | 3 |
| Second I/O port | AID002 | 3 | 2 | 1 |
| Third I/O port | AID003 | 2 | 3 | 2 |

According to Table 1, when the input message corresponds to the NB-IoT protocol, the priority information corresponding to Case 1 is adapted, and the first I/O port 11 to which the host communication control module 200 is connected has the first priority (highest priority); when the input message corresponds to the WiFi protocol, the priority information corresponding to Case 2 is adapted, and the first I/O port 11 to which the host communication control module 200 is connected has the first priority; and when the smart IoT apparatus is a fire alarm apparatus, the priority information corresponding to Case 3 is adapted, and the second I/O port 12 to which the controlled device 300 (e.g., a fire alarm) is connected has the first priority.

Table 2 below exemplarily shows the status information, which includes the channel flag information (see "Flag" column), the application execution information (see "AID" column), the I/O port occupation information and the channel status information. The channel flag information indicates the registered channels that are related to the first I/O port 11 (I/O port 1) and that are respectively marked as "Current Channel" and "Virtual Channel" (i.e., channels 0 and 1). The application execution information indicates the application identifiers corresponding to the application programs executed through the channels 0 and 1 (i.e., "AID001" and "AID003"). The I/O port occupation information indicates the application programs that call another application program (see "Request I/O" column), and the occupation conditions of the I/O ports, which may be used as request ports (see "Request I/O" column) or output ports (see "Output I/O" column), where the output ports maybe used to output an execution result for an executed application program. The channel status information indicates status of the channels 0 and 1, as shown in the column "Channel status". Note that a status of "Registered/suspended" means that the channel is registered by an application program that is currently being executed, but the channel is temporarily suspended, and a status of "Registered/executing" means that the channel is registered by an application program that is currently being executed, and the channel is currently being used in executing the application program.

TABLE 2

| | | | I/O port occupation information | | |
|---|---|---|---|---|---|
| Channel | Flag | AID | Request I/O | Output I/O | Channel status |
| 0 | Current Channel | AID001 | I/O port 1 | | Registered/ suspended |
| 1 | Virtual Channel 1 | AID003 | AID001 | | Registered/ executing |

Based on an exemplary condition as shown in Tables 1 and 2, in a first case that the input message comes from the second I/O port 12 to call an application program "AID002" and Case 3 of the priority information is adapted, the control module 5 determines to execute the routing process relating to the input message in step S202 because the priority of the second I/O port 12 is higher than that of the first I/O port 11 under Case 3, and the application program "AID002" called by the input message is different from the currently executed application programs "AID001" and "AID003", which does not violate the predetermined conflict management mechanism. In a second case that the input message comes from the second I/O port 12 to call the application program "AID001" and Case 3 of the priority information is adapted, the control module 5 determines to not execute the routing process relating to the input message in step S202 because the application program "AID001" called by the input message is currently being executed, which violates the predetermined conflict management mechanism (although the priority of the second I/O port 12 is higher than the first I/O port 11 according to the priority information).

In this embodiment, the routing process relating to the input message includes the following steps S204 through S219.

In step S204, the control module 5 determines whether the input message includes a multi-channel management instruction. Upon determining that the input message includes a multi-channel management instruction in step S204, the control module 5 opens a specific channel corresponding to a specific kernel according to the multi-channel management instruction, closes other channels that correspond to the specific kernel, controls switching operation of the switch module 3 to transmit a channel management result to the source port through the switch module 3, and updates the status information that is stored in the status zone 23 according to the channel management result (step S205). Then, the source port becomes a current request port.

Following the abovementioned first case, when it is determined that the input message includes a multi-channel management instruction, the control module 5 would update the status information that corresponds to Table 2 to a condition as indicated in Table 3.

TABLE 3

| | | | I/O port occupation information | | |
|---|---|---|---|---|---|
| Channel | Flag | AID | Request I/O | Output I/O | Channel status |
| 0 | Sleep Channel | AID001 | I/O port 1 | | Registered/ suspended |
| 1 | Virtual Channel 1 | AID003 | AID001 | | Registered/ suspended |
| 2 | Current Channel | AID002 | I/O port 2 | | Registered/ executing |

In Table 3, the specific channel (i.e., Channel 2) is opened, and the other channels that correspond to the same kernel as Channel 2 (i.e., Channel 0 and Channel 1) are closed, and Channels 0, 1 and 2 are respectively marked as being "Sleep Channel", "Virtual Channel 1" and "Current Channel".

When the determination made in step S204 is negative, the flow goes to step S206 where the control module 5 determines whether the input message includes a user-device authentication instruction relating to a to-be-authenticated user device that generates the input message. Before making the determination, if the input message further includes a ciphertext (i.e., an encrypted message), it may be necessary to use the encryption-decryption circuit 51 to decrypt the ciphertext after successfully performing a check to confirm that the cipher has not been tampered with. Upon determining that the input message includes a user-device authentication instruction relating to a to-be-authenticated user device that generated the input message, the control module 5 transmits the (decrypted) input message to the identity verification module 4, and cooperates with the identity verification module 4 to execute, based on the identity verification data, the password data and the input message, a verification procedure that corresponds to the user-device authentication instruction (step S207). In step S208, the control module 5 determines whether the verification corresponding to the user-device authentication instruction is successful based on whether a successful verification result is received from the identity verification module 4. Upon receipt of the successful verification result from the identity verification module 4, the control module 5 controls switching operation of the switch module 3 to transmit the successful verification result to the source port (step S209). When the control module 5 receives a failed verification result (i.e., the control module 5 determines that the verification corresponding to the user-device authentication instruction is not successful) from the identity verification module 4 (one predefined type of the unfavorable event) in step S208, the flow goes to step S216.

Upon determining that the input message does not include a user-device authentication instruction relating to the to-be-authenticated user device that generated the input message in step S206, the flow proceeds to step S210, where the control module 5 determines whether or not the input message relates to one of an application (e.g., Java applet) instruction and an application authentication (e.g., Java authentication) instruction. If the determination made in step S210 is affirmative, the control module 5 executes one of the application programs stored in the program zone 21 that corresponds to said one of the application instruction and the application authentication instruction, and acquires an execution result (step S211). When the determination made in step S210 is negative (i.e., the control module 5 determines that the input message does not relate to either an application instruction or an application authentication instruction), the control module 5 determines that the input message is a false instruction (one predefined type of the unfavorable event), and the flow goes to step S216.

In step S212, the control module 5 determines whether the application program executed in step S211 includes a control instruction relating to another one of the I/O ports 11-13 other than the source port. Upon determining that the application program executed in step S211 includes a control instruction relating to another one of the I/O ports 11-13, the control module 5 controls switching operation of the switch module 3 to transmit the control instruction to said another one of the I/O ports 11-13 through the switch module 3, and updates the status information stored in the status zone 21 (e.g., adding said another one of the I/O ports 11-13 to the "Output I/O" column in the status information) (step S213).

For example, in a case that the smart IoT apparatus is a smart air conditioner apparatus and the input message is received from the first I/O port 11 (source port) and is related to a Java applet for temperature control of an air conditioner (the controlled device 300) of the smart air conditioner apparatus, when the control module 5 determines that the Java applet includes a control instruction relating to temperature control of the air conditioner, the control module 5 transmit the control instruction to the second I/O port 12 (the another one of the I/O ports), so that the air conditioner performs operations relating to the temperature control based on the control instruction received from the second I/O port 12. When the control module 5 determines that the input message does not include any control instruction relating to another one of the I/O ports 11-13, the flow goes to step S214.

In step S214, the control module 5 determines whether the execution result acquired in step S211 contains an error message or an abnormal message. Upon determining that the execution result does not contain any error messages or abnormal messages, the control module 5 controls switching operation of the switching module 3 to transmit a completion response corresponding to the input message to the source port for notifying that the routing process has been completed (step S215), and waits for receipt of a confirmation response corresponding to the completion response from the source port. When the control module 5 determines that the execution result contains an error messages or an abnormal message (one predefined type of the unfavorable event), the flow goes to step S216.

In step S216, the error-abnormality handling circuit 52 of the control module 5 analyzes the unfavorable event to obtain an analysis result, and records the analysis result in a specific one of the application programs (step S216).

In step S217, the control module 5 determines whether the occurrence of the unfavorable event satisfies a predetermined warning criterion. When the determination made in step S217 is negative, the control module 5 controls switching operation of the switch module 3 to transmit an event response relating to the unfavorable event to the source port through the switch module 3 (step S218) for notifying the occurrence of the unfavorable event, and waits for receipt of a confirmation response corresponding to the event response from the source port. The predetermined warning criterion may be, for example, a predetermined event occurrence number related to an accumulated number of occurrences of the same type of unfavorable event. In such a case, when the occurrence of the unfavorable event causes the accumulated number of occurrences of the same type of unfavorable event to reach the predetermined event occurrence number, the error-abnormality handling circuit 52 determines that the occurrence of the predefined unfavorable event satisfies the predetermined warning criterion, but this disclosure is not limited in this respect. For example, the predetermined warning criterion may relate to a number of times that the I/O ports 11-13 do not respond normally, or a number of issuance of interrupt services (such as timeout interrupt, busy interrupt, etc.) in other embodiments. It is noted that the error-abnormality handling circuit 52 may include artificial intelligence or deep learning mechanism, which may be realized in a form of circuits or by executing a software program, to learn and/or evolve over time, thereby converging abnormalities and/or attacking modes, but this disclosure is not limited in this respect. When the determination made in step S217 is affirmative, the control module 5 controls switching operation of the switch module 3 to selectively transmit an operation warning message to at least one of the source port and a specific one of the I/O ports 11-13 (which may be predefined in a corresponding application program as required by users) through the switch module 3 (step S219). For instance, when the control module 5 determines to transmit the operation warning message to the specific I/O port, the operation warning message may be transmitted to a management server end and/or a vendor server end via a communication module (not shown) that is electrically connected to the specific I/O port. Specifically, when the unfavorable event results from malicious attacks, the operation warning message may be effectively and timely reported to the administrator and/or the vendor of the smart IoT apparatus for subsequent handling of such situation.

After the end of the routing process (e.g., steps S215, S218 or S219), the control module 5 waits for the next input message after the status information has been updated (if required, as in steps S205 and S213).

It should be noted that, in other embodiments, the error-abnormality handling circuit 52 may be replaced by a software program that can be executed by the control module 5 to perform the same function.

Figure 4:
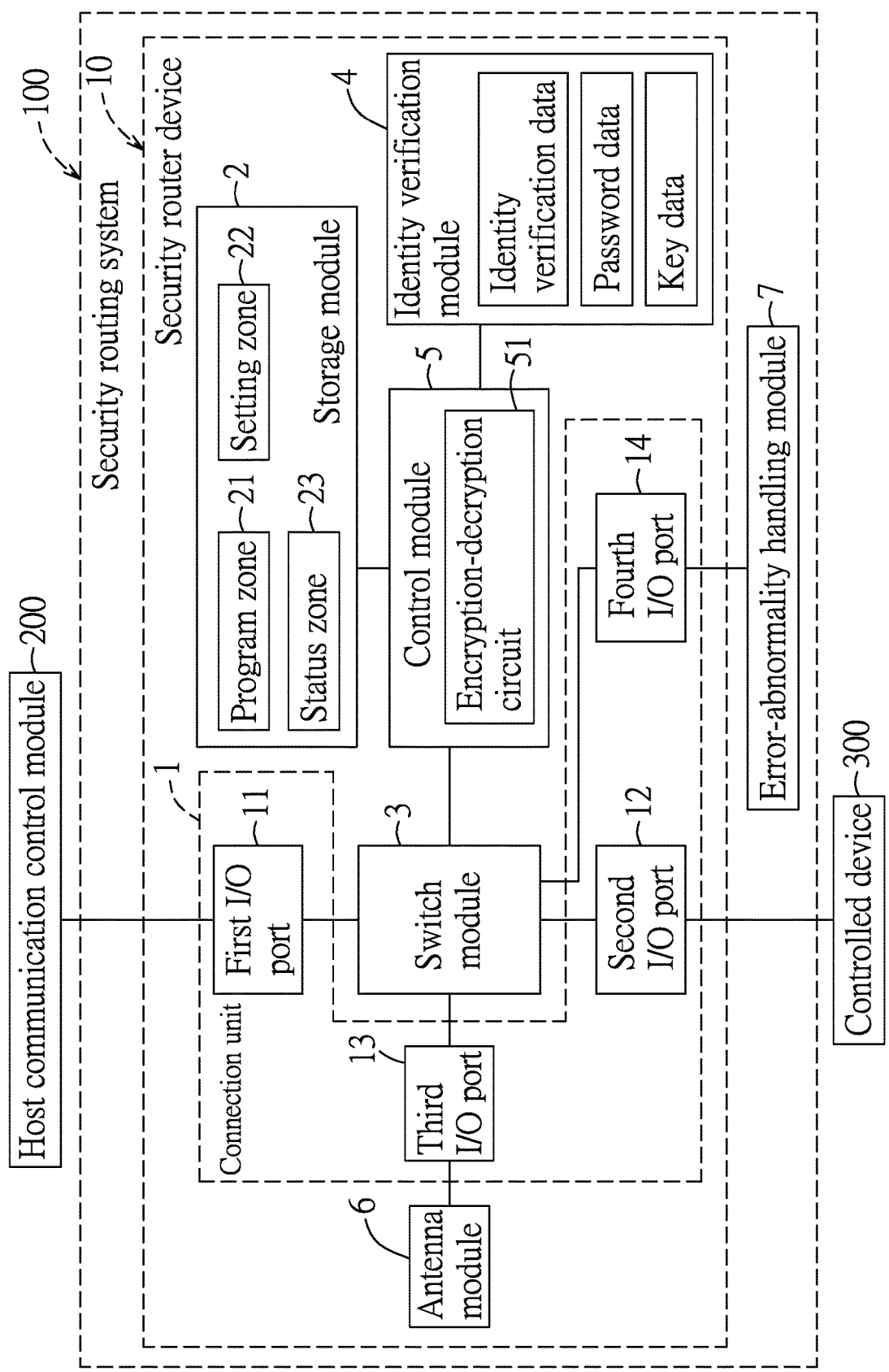
FIG. 4 is a block diagram illustrating a variation of the first embodiment.

FIG. 4 illustrates a variation of the first embodiment, which differs from the first embodiment depicted in FIG. 1 in that: the error-abnormality handling circuit 52 (see FIG. 1) is omitted; the security routing system 100 further includes an error-abnormality handling module 7 of which the functionality is similar to that of the abovementioned error-abnormality handling circuit 52, and which is electrically connected to a fourth I/O port 14 that is one of the I/O ports of the connection unit 1 and that serves as a reporting port for the control module 5 and the error-abnormality handling module 7. The fourth I/O port 14 may be a GPIO port, but this disclosure is not limited to such. Accordingly, in this variation, the routing process is cooperatively performed by the security router device 10 and the error-abnormality handling module 7, and steps S216-219 of the routing process as shown in FIG. 2 may be altered as described below.

In this variation, when an unfavorable event occurs, the control module 5 controls switching operation of the switch module 3 to transmit event information that relates to the unfavorable event to the error-abnormality handling module 7 through the switch module 3 and the reporting port, so that the error-abnormality handling module 7 can subsequently perform step S216 to analyze the unfavorable event based on the event information to obtain and store an analysis result in, for example, a specific application program.

In step S217, the error-abnormality handling module 7 executes the specific application program to determine whether or not the occurrence of the unfavorable event satisfies the predetermined warning criterion to obtain a determination result, and transmits the determination result to the reporting port. When the control module 5 receives the determination result indicating that the occurrence of the unfavorable event does not satisfy the predetermined warning criterion, the control module 5 performs step S218. When the control module 5 receives the determination result indicating that the occurrence of the unfavorable event satisfies the predetermined warning criterion, the control module 5 performs step S219.

Figure 5:
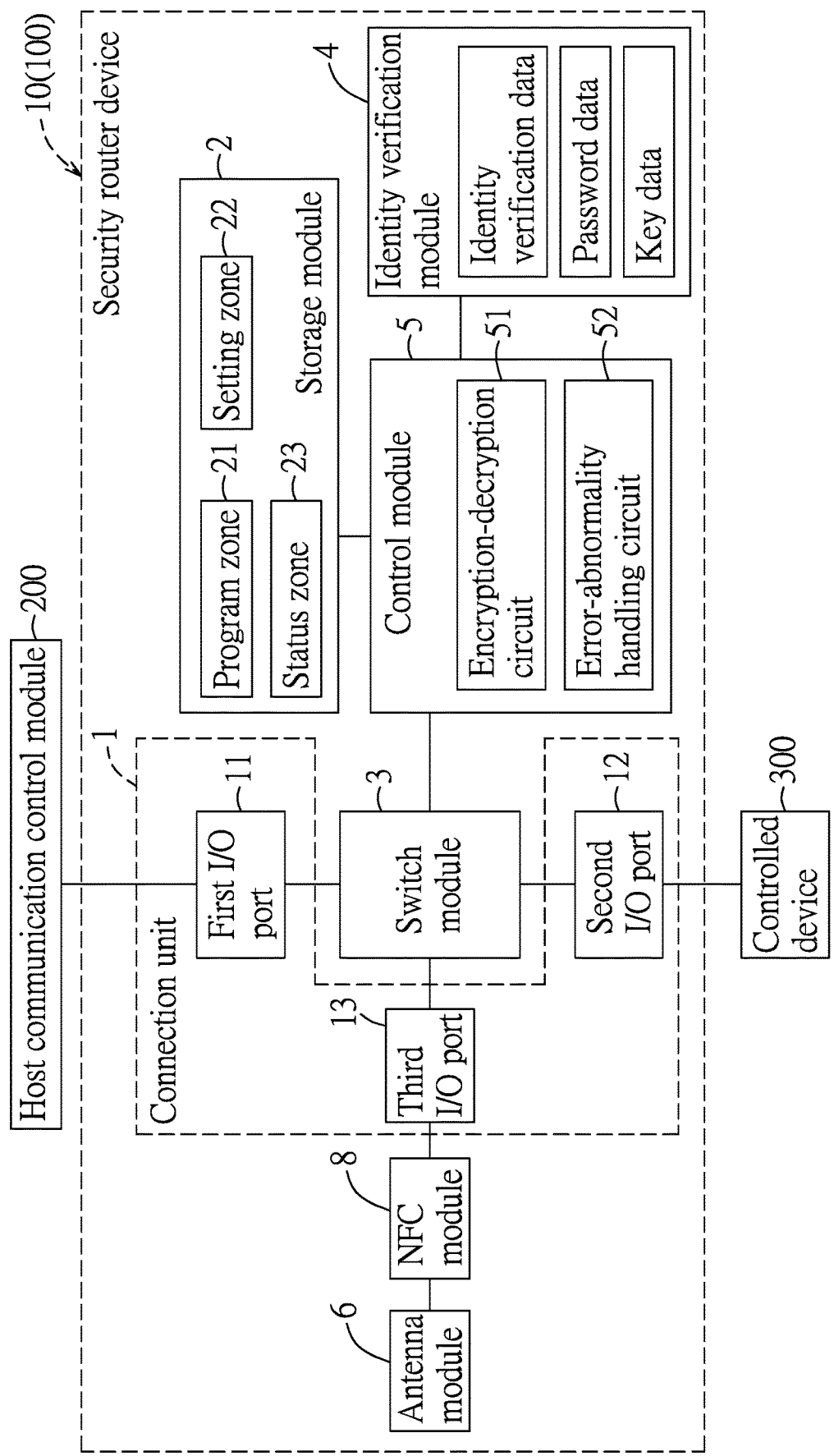
FIG. 5 is a block diagram illustrating another variation of the first embodiment.

FIG. 5 illustrates another variation of the first embodiment, which differs from the first embodiment depicted in FIG. 1 in that the security router device 10 further includes a near field communication (NFC) module 8 electrically connected between the antenna module 6 and the third I/O port 13, and serving as another communication means for the security router device 10.

Figure 6:
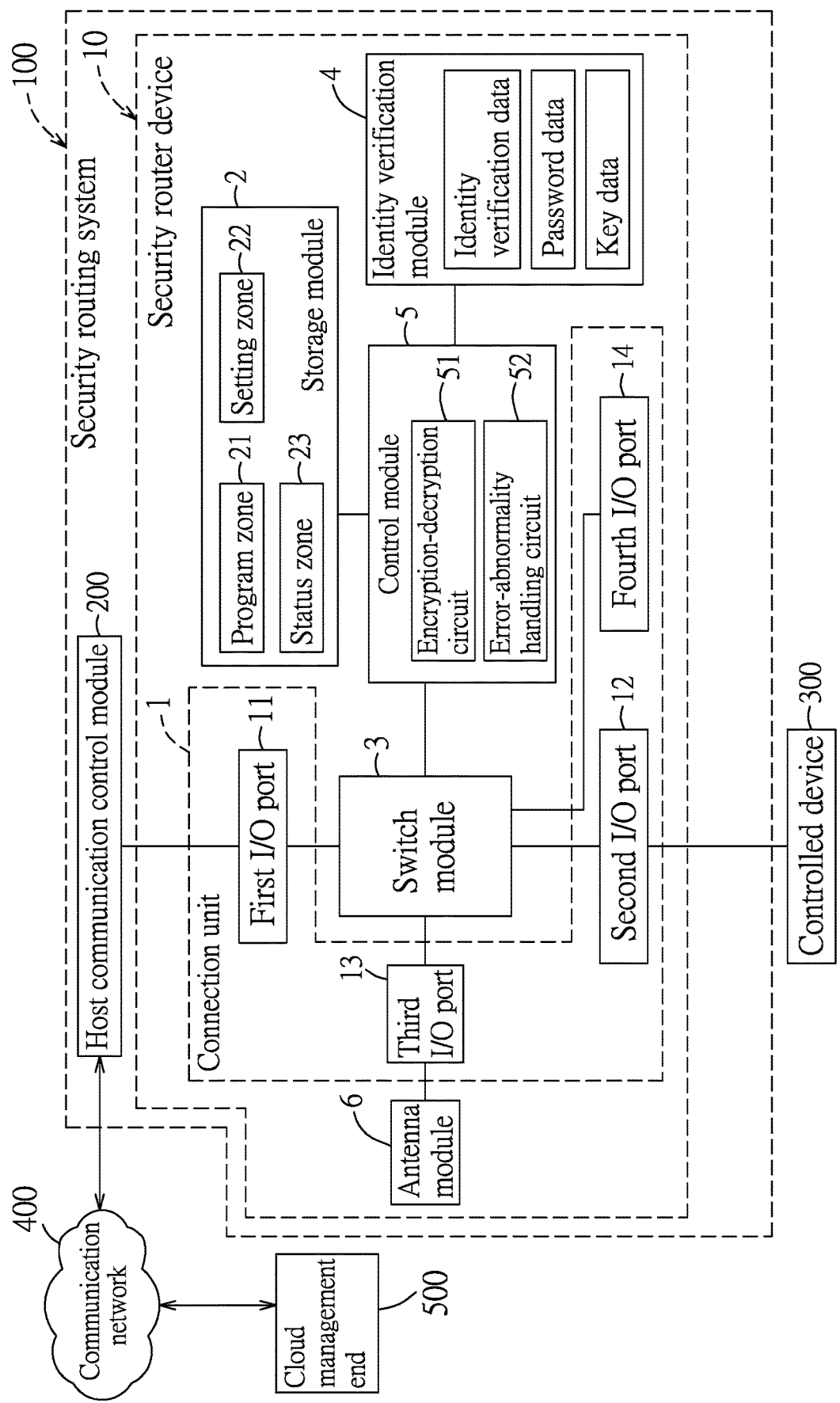
FIG. 6 is a block diagram illustrating a second embodiment of the routing system according to the disclosure.

FIG. 6 illustrates a second embodiment of the security routing system 100 according to this disclosure. The second embodiment is similar to the first embodiment, and differs therefrom in that: the security routing system 100 further includes the host communication control module 200, where the host communication control module 200 is operable between a safe service mode and a normal service mode. The normal service mode and the safe service mode are different/independent service instances of the host communication control module 200. Even if the host communication control module 200 is attacked under the normal service mode so that the service provided in the normal service mode is interrupted or necessary functional services are unable to be provided in the normal service mode, activation of the safe service mode will not be affected. In this embodiment, the first I/O port 11 may be realized as an internal bus, so that the security router device 10 and the host communication control module 200 can be integrated more effectively.

When a predefined abnormal condition happens, the control module 5 marks a flag that indicates a communication condition of the host communication control module 200 abnormal, and controls switching operation of the switch module 3 to transmit a reset signal to the host communication control module 200 through a reset port which is one of the I/O ports other than the first I/O port 11 and which is capable of connecting to the host communication control module 200 (e.g., a fourth I/O port 14, which may be but not limited to a GPIO port). In this embodiment, the reset signal can be generated by a reset circuit included in the control module 5, or by a reset signal generation procedure that is executed by the control module 5. The predefined abnormal condition may be: a condition of the control module 5 not receiving the confirmation response that relates to a response for notification (e.g., the busy response, the completion response, the event response) that is previously outputted by the control module 5 through the source port; or a condition of the first I/O port 11 continuously receiving messages (e.g., malicious packets) with an amount of data included in the messages exceeding an upper processing limit of the routing system 100 (i.e., exceeding processing capability of the routing system 100), or exceeding a predefined amount within a predefined length of time.

Then, the host communication control module 200 executes a reset procedure in response to the reset signal received thereby. When the host communication control module 200 is being reset, the host communication control module 200 may communicate with the security router device 10 to cause the control module 5 to perform corresponding reset operation. After the host communication control module 200 completes execution of the reset procedure (i.e., after the control module 5 is reset), when the control module 5 determines that the flag is still marked abnormal, the control module 5 transmits a communication warning message that indicates an abnormal communication condition to the first I/O port 11 through the switch module 3, so that the host communication control module 200 switches operation thereof from the normal service mode, in which the host communication control module 200 currently operates, to the safe service mode in response to the communication warning message received thereby. When the host communication control module 200 operates in the safe service mode, the security router device 10 is still permitted by the host communication control module 200 to have limited communication with a cloud management end 500 through the host communication control module 200, so that current status information of the security router device 10 and specific information required by the cloud management end 500 can be provided to the cloud management end 500, but this disclosure is not limited in this respect.

In the safe service mode (e.g., the host communication control module 200 stops all the services provided in the normal service mode except for communication to a management end in order to provide important/necessary messages thereto for, for example, trouble shooting purposes), the host communication control module 200 transmits a security notification indicating that the host communication control module 200 has a security issue, to the cloud management end 500, a user end (not shown), or both, through a communication network 400. If the host communication control module 200 still has normal external communication ability, the security notification can be successfully transmitted to the cloud management end 500, and in response to the security notification, the cloud management end 500 may feedback to the host communication control module 200, a security notification response message that represents normal communication for the host communication control module 200. Upon receipt of the security notification response message, the host communication control module 200 switches operation thereof from the safe service mode back to the normal service mode, and transmits the security notification response message to the first I/O port 11, so that the control module 5 cancels the abnormal marking for the flag upon receipt of the security notification response message from the host communication control module 200 through the first I/O port 11. By virtue of the above operations, the normal communication ability of the host communication control module 200 can be confirmed, and the malicious attack can be effectively excluded. In a case that the external communication ability of the host communication control module 200 is abnormal due to, for example, a WiFi module (not shown) of the host communication control module 200 being damaged such that the security notification cannot be transmitted to the cloud management end 500 successfully, the host communication control module 200 repeats the reset procedure when the host communication control module 200 does not receive the security notification response message for a predetermined period of time from the time the security notification is transmitted. When a number of the repeated executions of the reset procedure has reached a predetermined reset number, the host communication control module 200 may, for example, communicate with the control module 5 to cause the control module 5 to transmit an abnormal communication message to a communication module (not shown) that is electrically connected to another I/O port (not shown) through the switch module 3. Then, the communication module may transmit the abnormal communication message to the cloud management end 500 through another communication network (not shown), but this disclosure is not limited in this respect.

Figure 7:
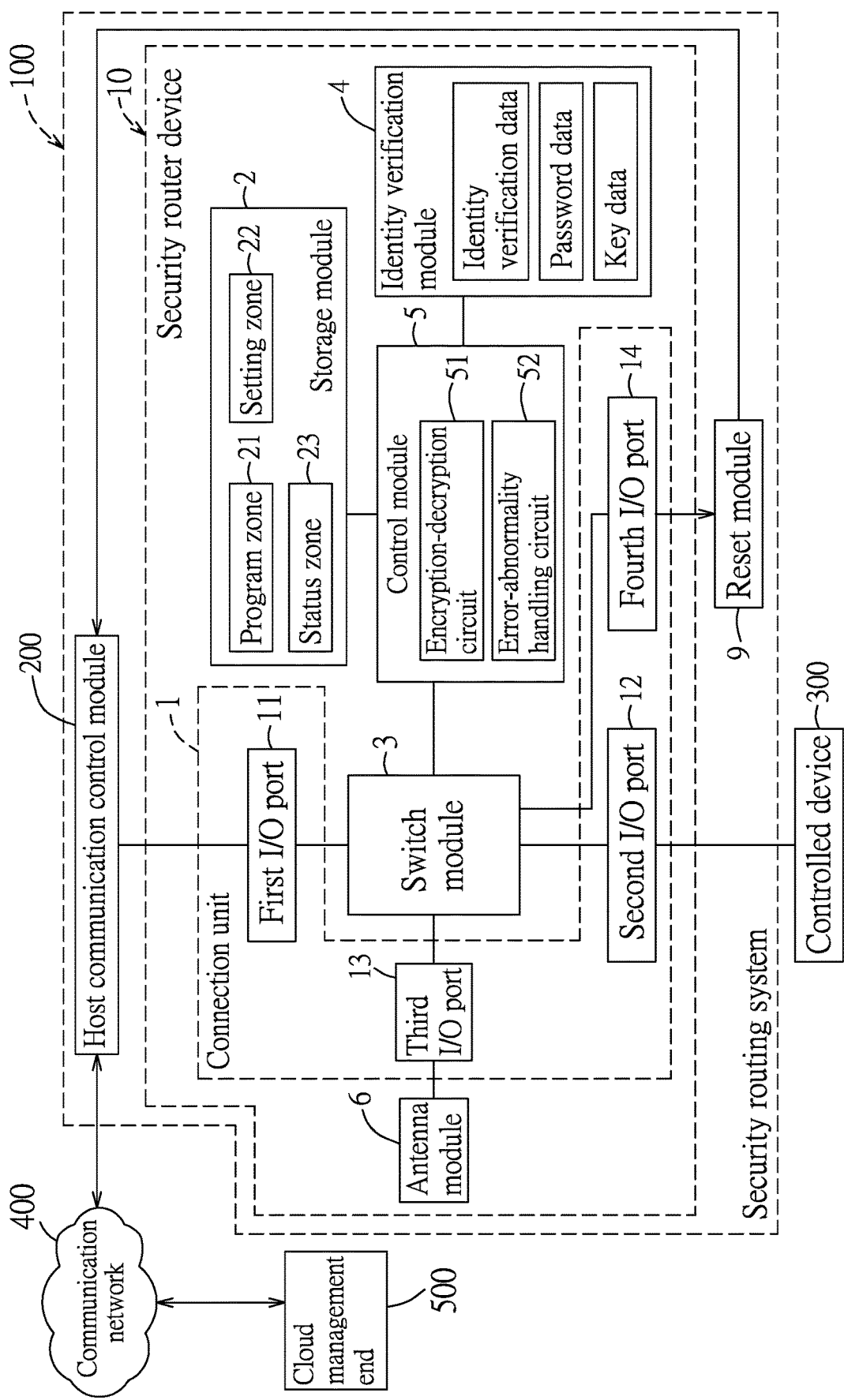
FIG. 7 is a block diagram illustrating a variation of the second embodiment.

FIG. 7 illustrates a variation of the second embodiment, which differs from the embodiment depicted in FIG. 6 in that: the security routing system 100 further includes a reset module 9 electrically connected between the reset port (the fourth I/O port 14) and the host communication control module 200, and the reset module 9 is responsive to receipt of a driving signal to generate the reset signal, and transmits the reset signal to the host communication control module 200 to make the host communication control module 200 execute the reset procedure in response to the reset signal received thereby; and the control module 5 is configured to generate the driving signal when the predefined abnormal condition occurs, and controls switching operation of the switch module 3 to transmit the driving signal to the reset module 9 through the switch module 3 and the reset port.

Figure 8:
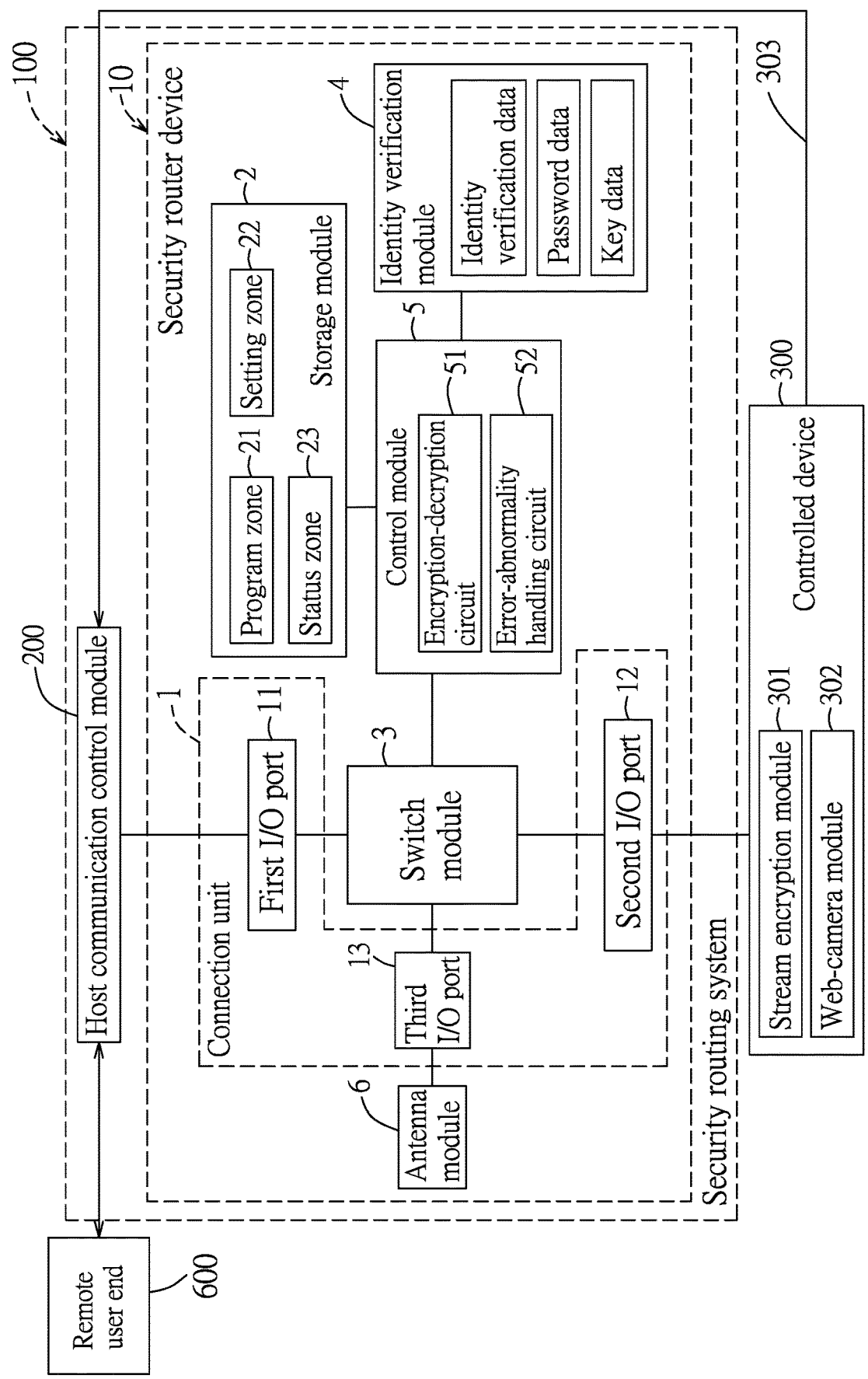
FIG. 8 is a block diagram illustrating a third embodiment of the routing system according to the disclosure.

FIG. 8 illustrates a third embodiment of the security routing system 100 according to this disclosure, which is similar to the first embodiment. In the third embodiment, the smart IoT apparatus is realized as a web camera apparatus, and the controlled device 300 includes a web-camera module 302 and a stream encryption module 301.

In this embodiment, the security routing system 100 further includes the host communication control module 200, and the communication protocols supported by the host communication control module 200 further include a streaming protocol for external communication, where the streaming protocol relates to a streaming service. The key data stored in the identity verification module 4 further includes a plurality of stream encryption keys for stream encryption, and a plurality of stream decryption keys for stream decryption. The stream decryption keys respectively correspond to the stream encryption keys.

In use, upon receipt of a request of dispersed keys from a remote user end 600, the host communication control module 200 transmits the request of dispersed keys to the first I/O port 11. In this case, the request of dispersed keys serves as the input message, and the first I/O port 11 serves as the source port. Then, the control module 5 may determine that the request of dispersed keys received through the switch module 3 and the first I/O port 11 relates to a Java authentication instruction in step S210 (see FIG. 2), and execute one of the application programs corresponding to the Java authentication instruction in step S211 (see FIG. 2). In step S211, the control module 5 communicates with the identity verification module 4 to cause the identity verification module 4 to provide, after successfully verifying identity of the remote user end 600, one or more stream encryption keys and one or more stream decryption keys corresponding to said one or more stream encryption keys to serve as the execution result. Then, the control module 5 controls switching operation of the switch module 3 to transmit said one or more stream encryption keys to the controlled device 300 through the second I/O port 12, so that the stream encryption module 301 uses said one or more stream encryption keys to encrypt streaming data captured by the web-camera module 302, and transmits the encrypted streaming data to the host communication control module 200 through another transmission path 303 (for example but not limited to, a physical wire/cable that is directly connected between the controlled device 300 and the host communication control module 200). The control module 5 also encrypts said one or more stream decryption keys using a specific encryption method to obtain, for example, a ciphertext, and transmits the ciphertext (i.e., the encrypted one or more stream decryption keys) to the host communication control module 200 through the first I/O port 11. The ciphertext serves as the completion response.

Then, the host communication control module 200 completes the streaming service by transmitting to the remote user end 600, the ciphertext which is received from the first I/O port 11 and the encrypted streaming data which is received from the controlled device 300. Accordingly, the remote user end 600 can use a specific decryption method that corresponds to the specific encryption method used by the control module 5 to decrypt the ciphertext (i.e., the encrypted one or more stream decryption keys) received from the host communication control module 200 to acquire said one or more stream decryption keys, and use said one or more stream decryption keys to decrypt the encrypted streaming data received from the host communication control 200. As a result, the remote user end 600 may use a streaming media player (not shown) to reproduce the streaming data, and the user can thus watch the images/videos captured by the web-camera module 302. In such configuration, even if the host communication control module 200 that has an open-source system architecture has security flaws, the security routing system 100 can still ensure the security of the keys for communication and encryption/decryption of streaming data, thereby obviating privacy problems and preventing services from losing the keys.

In summary, since the security router device 10 has a virtual machine architecture that complies with an open specification, and complies with the Common Criteria standard at a level equal to or over EAL 4 in terms of both hardware and software, the security router device 10 can be used as a hardware firewall between the host communication control module 200 and the controlled device 300, and can provide commonality on development of applications on a basis of reliable security without being limited by different hardware architectures or performances of the host communication control module 200 and the controlled device 300, thereby being widely applicable to a variety of smart IoT apparatuses. In addition, the security router device 10 uses the identity verification data, the password data, the key data and/or execution of the relevant application programs to perform security identification relating to the input message and/or conversion and transmission of the instructions for controlling the controlled device 300, where the application programs and the key data may be updated by OTA downloading, thereby reducing costs for update. Furthermore, the security routing system 100 may effectively detect and collect abnormal conditions of the host communication control module 200 or the controlled device 300 which may result from the same being attacked, and timely issue the warning messages to a management end and/or vendor end.

In the description above, for the purposes of explanation, numerous specific details have been set forth in order to provide a thorough understanding of the embodiment(s). It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A routing system adapted for use in an Internet-of-things (IoT) apparatus, said IoT apparatus including a host communication control module supporting multiple communication protocols, and a controlled device, said routing system comprising a router device that includes:
 a connection unit that complies with the communication protocols, and that includes a plurality of input-output (I/O) ports including a first I/O port to be electrically connected to the host communication control module and supporting protocol conversion for any message from the host communication control module, and a second I/O port to be electrically connected to the controlled device and supporting protocol conversion for any message from the controlled device;
 a switch module electrically connected to said connection unit, and operable to selectively establish communication paths among said I/O ports;
 a control module electrically connected to said switch module for controlling switching operation thereof and supporting multi-channel operation;
 a storage module electrically connected to said control module, and including a program zone in which a plurality of application programs respectively corresponding to different application identifiers are stored, a setting zone in which environment setting information relating to said connection unit is stored, and a status zone in which status information that indicates a current execution status of said router device is stored, wherein the environment setting information includes application identifier information that indicates the application identifiers corresponding to the application programs that are capable of being used by said I/O ports, and priority information that indicates priorities of said I/O ports; and
 an identity verification module electrically connected to said control module, storing therein identity verification data and password data relating to identity verification for at least one user device that is connected to the host communication control module or at least one user of said at least one user device, and key data for encryption operation on transmission of messages, and encryption-decryption operation on the messages;
 wherein:
 when said control module receives an input message through said switch module and a source port which is one of said I/O ports, said control module determines whether to execute a routing process relating to the input message according to the environment setting information stored in said setting zone, the status information stored in said status zone, and a predetermined conflict management mechanism;
 when said control module determines to not execute the routing process relating to the input message, said control module controls switching operation of said switch module to transmit a busy response notifying one of a busy status and a waiting instruction to said source port through said switch module; and
 when said control module determines to execute the routing process relating to the input message, said control module executes the routing process that relates to the input message and that includes:
 upon determining that the input message includes a multi-channel management instruction, opening a specific channel corresponding to a specific kernel according to the multi-channel management instruction, closing other channels that correspond to the specific kernel, controlling switching operation of said switch module to transmit a channel management result to said source port through said switch module, and updating the status information that is stored in said status zone according to the channel management result;
 upon determining that the input message includes a user-device authentication instruction relating to a to-be-authenticated user device that generates the input message, transmitting the input message to said identity verification module, cooperating with said identity verification module to execute a verification procedure that corresponds to the user-device authentication instruction based on the identity verification data, the password data and the input message, and controlling, upon receipt of a successful verification result from said identity verification module, switching operation of said switch module to transmit the successful verification result to said source port; and upon determining that the input message relates to one of an application instruction and an application authentication instruction, performing an operation of executing one of the application programs stored in said program zone that corresponds to said one of the application instruction and the application authentication instruction to acquire an execution result, an operation of, upon determining that said one of the application programs that corresponds to said one of the application instruction and the application authentication instruction includes a control instruction relating to another one of said I/O ports, controlling switching operation of said switch module to transmit the control instruction to said another one of said I/O ports through said switch module, and updating the status information stored in said status zone, and an operation of, upon determining that the execution result does not contain any error messages or abnormal messages, controlling switching operation of said switching module to transmit a completion response corresponding to the input message to said source port for notifying that the routing process has been completed.

2. The routing system of claim 1, wherein the application instruction is a Java applet instruction, and the authentication instruction is a Java authentication instruction.

3. The routing system of claim 2, wherein the status information includes:

channel flag information that indicates a channel registration condition of a channel currently registered by a request port which is one of said I/O ports;

application execution information that indicates the application identifiers corresponding to the application programs that are currently executed through channels which are currently registered;

I/O port occupation information that indicates occupation conditions of said I/O ports; and channel status information that indicates status of the channels which are currently registered;

wherein, when said control module determines, according to the priority information, that the priority of said source port is higher than that of said request port, and determines, based on the predetermined conflict management mechanism and the I/O port occupation information, that said source port has not been occupied, said control module determines to execute the routing process that relates to the input message, suspends execution of and temporarily saves each of the application programs executed through the channels which are currently registered, and updates the status information;

wherein, when said control module determines, according to the priority information, that the priority of said source port is lower than that of said request port, said control module determines to not execute the routing process relating to the input message; and wherein, when said control module determines, based on the predetermined conflict management mechanism and the I/O port occupation information, that said source port has been occupied, said control module determines to not execute the routing process relating to the input message.

4. The routing system of claim 2, wherein, when an unfavorable event occurs, said control module performs operations of:

analyzing the unfavorable event to obtain an analysis result, and recording the analysis result in a specific one of the application programs;

controlling switching operation of said switch module to transmit an event response relating to the unfavorable event to said source port through said switch module upon determining that the occurrence of the unfavorable event does not satisfy a predetermined warning criterion; and controlling switching operation of said switch module to selectively transmit a warning message to at least one of said source port and a specific one of said I/O ports through said switch module upon determining that the occurrence of the unfavorable event satisfies the predetermined warning criterion; and wherein the unfavorable event is one of:

an event of said control module determining that the input message is a false instruction;

an event of said control module receiving a failed verification result from said identity verification module; and an event of said control module determining that the execution result contains at least one of an error message and an abnormal message.

5. The routing system of claim 4, wherein said control module includes an error-abnormality handling circuit configured to perform the analysis on the unfavorable event.

6. The routing system of claim 2, further comprising an error-abnormality handling module electrically connected to a reporting port which is one of said I/O ports other than said first and second I/O ports, wherein, when an unfavorable event occurs, said control module controls switching operation of said switch module to transmit event information that relates to the unfavorable event to said error-abnormality handling module through said switch module and said reporting port;

wherein said error-abnormality handling module analyzes the unfavorable event based on the event information to obtain and store an analysis result, determines whether or not the occurrence of the unfavorable event satisfies a predetermined warning criterion to obtain a determination result, and transmits the determination result to said reporting port;

wherein, when said control module receives the determination result indicating that the occurrence of the unfavorable event does not satisfy the predetermined warning criterion, said control module controls switching operation of said switch module to transmit an event response relating to the unfavorable event to said source port through said switch module;

wherein, when said control module receives the determination result indicating that the occurrence of the unfavorable event satisfies the predetermined warning criterion, said control module controls switching operation of said switch module to selectively transmit a warning message to at least one of said source port and a specific one of said I/O ports through said switch module; and wherein the unfavorable event is one of:
- an event of said control module determining that the input message is a false instruction;
- an event of said control module receiving a failed verification result from said identity verification module; and
- an event of said control module determining that the execution result contains at least one of an error message and an abnormal message.

7. The routing system of claim 2, wherein said control module of said router device includes an encryption-decryption circuit configured to perform encryption and decryption operations based on the key data stored in said identity verification module and one of a symmetric-key algorithm and an asymmetric-key algorithm.

8. The routing system of claim 7, wherein said control module is configured to, before said encryption-decryption circuit performs a decryption operation on an encrypted message, use a check algorithm to check whether the encrypted message has been tampered with.

9. The routing system of claim 8, wherein said control module and said switch module are integrated as one of a single core unit and a multi-core unit by hardware, software, or a combination thereof.

10. The routing system of claim 2, wherein said first I/O port is an internal bus.

11. The routing system of claim 2, wherein, when said host communication control module that is electrically connected to said first I/O port is being initialized, said control module loads the application programs and the environment setting information into said storage module through said host communication control module, and loads the identity verification data, the password data and the key data into said identity verification module through said host communication control module;
wherein said control module is configured to permit update of the environment setting information when said router device is being reset; and
wherein said control module is configured to permit update of the environment setting information in response to an update instruction which is received by said control module from one of said I/O ports.

12. The routing system of claim 2, wherein, when a predefined abnormal condition happens, said control module marks a flag that indicates a communication condition of said host communication control module abnormal;
wherein said control module cancels the marking for the flag upon receipt a notification message indicating that the communication condition thereof is normal from said host communication control module;
wherein the predefined abnormal condition is one of:
a condition of said control module not receiving a confirmation response that relates to a response for notification that is previously outputted by said control module through said source port; and
a condition of said first I/O port continuously receiving messages with an amount of data of the messages exceeding an upper processing limit for said routing system.

13. The routing system of claim 12, wherein, when the predefined abnormal condition happens, said control module further controls switching operation of said switch module to transmit a reset signal to said host communication control module through a reset port which is one of said I/O ports other than said first I/O port and which is capable of connecting to said host communication control module, and said host communication control module executes a reset procedure in response to the reset signal received thereby.

14. The routing system of claim 13, wherein the reset signal is generated by one of a reset circuit included in said control module and a reset signal generation procedure that is executed by said control module.

15. The routing system of claim 13, wherein, when said control module determines that the flag is still marked abnormal after said host communication control module completes execution of the reset procedure, said control module transmits a warning message that indicates an abnormal communication condition to said first I/O port through said switch module, so that said host communication control module switches operation thereof from a normal service mode in which said host communication control module currently operates to a safe service mode in response to the warning message received thereby;
wherein, in the safe service mode, said host communication control module transmits, to at least one of a user end and a cloud management end through a communication network, a security notification indicating that said host communication control module has a security issue;
wherein, upon receipt of a notification response that represents normal communication for said host communication control module and that corresponds to the security notification, said host communication control module switches operation thereof from the safe service mode to the normal service mode, and transmits the notification response to said first I/O port; and
wherein said host communication control module repeats execution of the reset procedure when said host communication control module does not receive the notification response for a predetermined period of time from a time the security notification is transmitted.

16. The routing system of claim 12, wherein one of said I/O ports other than said first I/O port is a reset port capable of connecting to said host communication control module;
wherein said routing system further comprises a reset module electrically connected between said reset port and said host communication control module;
wherein said control module generates a driving signal when the predefined abnormal condition occurs, and controls switching operation of said switch module to transmit the driving signal to said reset module through said switch module and said reset port;
wherein said reset module is configured to generate a reset signal in response to receipt of the driving signal, and transmit the reset signal to said host communication control module to make said host communication control module execute a reset procedure in response to the reset signal received thereby.

17. The routing system of claim 16, wherein, when said control module determines that the flag is still marked abnormal after said host communication control module completes execution of the reset procedure, said control module transmits a warning message that indicates an abnormal communication condition to said first I/O port through said switch module, so that said host communication control module switches operation thereof from a normal service mode in which said host communication control module currently operates to a safe service mode in response to the warning message received thereby;
wherein, in the safe service mode, said host communication control module transmits, to at least one of a user end and a cloud management end through a communication network, a security notification indicating that said host communication control module has a security issue;

wherein, upon receipt of a notification response that represents normal communication for said host communication control module, said host communication control module switches operation thereof from the safe service mode to the normal service mode, and transmits the notification response to said first I/O port; and wherein said host communication control module repeats execution of the reset procedure when said host communication control module does not receive the notification response for a predetermined period of time from a time the security notification is transmitted.

18. The routing system of claim 2, each of the communication protocols being an individual one of WiFi, Bluetooth, BLE, Zigbee, 2G, 3G, 4G LTE, NBIoT and LoRa;

wherein said identity verification module is a verification module for verifying subscriber identity modules (SIMs); and wherein said application programs include at least a SIM application toolkit.

19. The routing system of claim 2, the controlled device including a web-camera module and a stream encryption module;

wherein the communication protocols include a streaming protocol for external communication, and the streaming protocol relates to a streaming service;

wherein the key data stored in said identity verification module includes a plurality of stream encryption keys for stream encryption, and a plurality of stream decryption keys for stream decryption, the stream decryption keys respectively corresponding to the stream encryption keys; and wherein, upon receipt of a request of dispersed keys from a remote user end, said host communication control module transmits the request of dispersed keys to said first I/O port, and said first I/O port serving as said source port;

wherein, when said control module determines that the request of dispersed keys received through said switch module and said first I/O port relates to a Java authentication instruction, and executes one of the application programs corresponding to the Java authentication instruction, said control module communicates with said identity verification module to cause said identity verification module to provide at least one of the stream encryption keys and at least one of the stream decryption keys corresponding to said at least one of the stream encryption keys to serve as the execution result, controls switching operation of said switch module to transmit said at least one of the stream encryption keys to said controlled device through said second I/O port, so that the stream encryption module uses said at least one of the stream encryption keys to encrypt streaming data captured by the web-camera module, and transmits the streaming data thus encrypted to said host communication control module through another transmission path, and encrypts said at least one of the stream decryption keys using a specific encryption method, and transmits said at least one of the stream decryption keys thus encrypted to said host communication control module through said first I/O port, said at least one of the stream decryption keys thus encrypted serving as the completion response; and wherein said host communication control module completes the streaming service by transmitting, to the remote user end, said at least one of the stream decryption keys received from said first I/O port and the streaming data encrypted using said at least one of the stream encryption keys and received from the controlled device.

20. The routing system of claim 2, wherein said router device further includes an antenna module electrically connected to a third I/O port, which is one of said I/O ports, and supporting radio frequency identification technology.

21. The routing system of claim 20, wherein said router device further includes a near field communication module electrically connected between said antenna module and said third I/O port.

22. The routing system of claim 2, wherein said router device complies with a Common Criteria standard at a level equal to or over evaluation assurance level 4 (EAL 4) in terms of both hardware and software, and complies with a Global Platform specification.

* * * * *

UNITED STATES PATENT AND TRADEMARK OFFICE
CERTIFICATE OF CORRECTION

| | |
|---|---|
| PATENT NO. | : 10,764,324 B2 |
| APPLICATION NO. | : 15/849392 |
| DATED | : September 1, 2020 |
| INVENTOR(S) | : Kung-Wei Chang and Yi-Fen Chou |

It is certified that error appears in the above-identified patent and that said Letters Patent is hereby corrected as shown below:

In the Specification

In Column 4, Line 9, please change "Global Platform Card specification" to --Global Platform specification--.

Signed and Sealed this
Seventeenth Day of May, 2022

Katherine Kelly Vidal
*Director of the United States Patent and Trademark Office*